United States Patent Office 2,926,139
Patented Feb. 23, 1960

2,926,139

LUBRICANTS FOR REFRIGERATING SYSTEMS

Friedrich R. Mott and Johannes Pfirschke, Leverkusen-Bayerwerk, and Heinrich Morschel, Leverkusen-Wiesdorf, Germany, assignors to Farbenfabriken Bayer Aktiengesellschaft, Leverkusen, Germany, a corporation of Germany No Drawing. Application November 3, 1953
Serial No. 390,097

Claims priority, application Germany
November 8, 1952

1 Claim. (Cl. 252—54.6)

The present invention relates to lubricants for refrigerating systems; more particularly it concerns lubricants for the use in refrigerating systems wherein difluoromonochloromethane is employed as refrigerant.

According to the invention oils of the type of polyesters, polyethers or polyester-ethers have proved to be especially valuable lubricants in refrigerating systems wherein difluoromonochloromethane is used as refrigerant.

Suitable polyesters are particularly those which are substantially free from hydroxyl groups, i.e. compounds as they are obtainable by reacting polyvalent alcohols with dicarboxylic acids in deficient quantities and subsequently esterifying the reaction products with monocarboxylic acids. Suitable polyethers and polyesterethers are described in Germany Patent 883,506 and in French Patent 898,269. The ester-oils described in British Patent 662,650 are likewise suited for the application as lubricants in the refrigerating systems contemplated. Special representatives of the types mentioned are, for instance, the following oils: the polyesters which are obtainable by reacting a mixture of 2 mols of butyleneglycol-1.3 and 1 mol of ethyleneglycol with a mixture of 1 mol of adipic acid and 1 mol of succinic acid and subsequently esterifying the remaining hydroxyl groups with butyric acid; furthermore the polyethers and polyether-esters which are obtainable according to Examples 2, 3, 4 and 5 of the German patent specification 883,506.

These oils may be employed in the above said refrigerators in the manner customary in the case of other lubricants in analogous cases.

As compared with lubricants on the basis of mineral oils the oils proposed according to the present invention have the advantage that they do not lead to precipitates in the refrigerant at the temperatures prevailing in the evaporator.

We claim:

A composition useful in refrigeration consisting essentially of difluoromonochloromethane as a refrigerant and a polymeric liquid lubricant, said lubricant being a polyester prepared by reacting a mixture of 2 mols of butyleneglycol-1,3 and 1 mol of ethyleneglycol with a mixture of 1 mol of adipic acid and 1 mol of succinic acid and subsequently esterifying the remaining hydroxy groups with butyric acid.

References Cited in the file of this patent

UNITED STATES PATENTS

| | | |
|---|---|---|
| 2,084,950 | Downing | June 22, 1937 |
| 2,552,084 | Bishop et al. | May 8, 1951 |
| 2,575,195 | Smith | Nov. 13, 1951 |
| 2,575,196 | Smith | Nov. 13, 1951 |
| 2,628,974 | Sanderson | Feb. 17, 1953 |

OTHER REFERENCES

Refrigerating Engineering, vols. 49 and 50, June 1945, pp. 473–477.